United States Patent
Patel et al.

(10) Patent No.: US 6,949,163 B2
(45) Date of Patent: Sep. 27, 2005

(54) METHOD OF FABRICATING A SLEEVE FOR JOINING AND SEALING CONDUITS

(75) Inventors: Jayant D. Patel, Lake Forest, CA (US); Alfred R. Wiratunga, Northridge, CA (US)

(73) Assignee: The Boeing Company, Seattle, WA (US)

( * ) Notice: Subject to any disclaimer, the term of this patent is extended or adjusted under 35 U.S.C. 154(b) by 152 days.

(21) Appl. No.: 10/697,065

(22) Filed: Oct. 30, 2003

(65) Prior Publication Data

US 2004/0089401 A1 May 13, 2004

Related U.S. Application Data

(62) Division of application No. 10/120,614, filed on Apr. 11, 2002, now Pat. No. 6,811,192.

(51) Int. Cl.$^7$ ............................................... B32B 31/26
(52) U.S. Cl. .................... 156/307.1; 156/294; 285/235; 285/417
(58) Field of Search .................... 156/87, 137, 141, 156/187, 289, 292, 293, 294, 307.1, 307.7; 285/235, 236, 294.1, 405, 406, 424, 331, 417; 138/137, 141, 149

(56) References Cited

U.S. PATENT DOCUMENTS

| | | |
|---|---|---|
| 115,588 A | 6/1871 | Fanning |
| 3,199,901 A | 8/1965 | Jeppsson |
| 3,451,696 A | 6/1969 | Hagelin et al. |
| 3,669,474 A | 6/1972 | Bode |
| 3,695,636 A | 10/1972 | Graves |
| 4,183,557 A * | 1/1980 | Hinden ........................ 285/53 |
| 4,221,407 A | 9/1980 | Steimle |
| 4,265,473 A | 5/1981 | Russo |
| 4,380,348 A | 4/1983 | Swartz |
| 4,861,631 A | 8/1989 | Hinden et al. |
| 6,000,435 A | 12/1999 | Patel et al. |

* cited by examiner

*Primary Examiner*—Jeff H. Aftergut
*Assistant Examiner*—John L. Goff
(74) *Attorney, Agent, or Firm*—Alston & Bird LLP

(57) ABSTRACT

The apparatus for joining and sealing conduits, includes edge trim, a sleeve, and a retaining element. The edge trim is shaped to mount upon and engage an end of a conduit. The sleeve extends between the conduits and at least partially surrounds the edge trim. The sleeve may be made of compressible material, such that when the retaining element surrounds a portion of the sleeve and the edge trim, the retaining element generally compresses the portion of the sleeve portion underlying the retaining element and displaces the sleeve material to expand on either side of the retaining element and limit movement of the retaining element. The method of joining and sealing conduits includes mounting the edge trim and a retaining element upon an end of a conduit, extending a sleeve between the conduits, and sliding the retaining element over the sleeve toward the end of the conduit.

4 Claims, 2 Drawing Sheets

METHOD OF FABRICATING A SLEEVE FOR JOINING AND SEALING CONDUITS

CROSS-REFERENCE TO RELATED APPLICATIONS

This application is a divisional of U.S. application Ser. No. 10/120,614, filed Apr. 11, 2002, now U.S. Pat. No. 6,811,192 which is hereby incorporated herein in its entirety by reference.

BACKGROUND OF THE INVENTION

The present invention relates to joining and sealing conduits, and, in particular, to joining and sealing conduits of various shapes in areas with a lack of accessibility and visibility.

Conduits, such as ducts, hoses, pipes, tubes and the like are frequently used to transport various fluids, gases or other elements within a structure, such as a vehicle, aircraft or building. Many times the conduits are installed after the structure is partially or totally built, and the conduits must be installed in pieces. The pieces of the conduits then must be joined and sealed after installation.

For example, in the aircraft industry, the environmental control system includes ducts to carry the fluids, gases, air, and the like required to regulate the environment of the aircraft. Typically, the environmental control system ducts are designed and installed after the aircraft is partially or totally built, such that the duct shape must conform to the available space and the ducts must be installed in pieces to avoid structural interferences. As the ducts are installed, nominal one to three inch gaps are generally maintained between the duct segments depending upon the length and material of the duct in order to allow for expansion during operation. Thus, the ducts may be round, elliptical, square, or any other shape that fits in the available space, and the segments of the duct must be joined and sealed in the already congested areas of the aircraft where there is little room to access or view the entire duct joint area.

The conventional manner of joining environmental control system ducts includes bonding elastomeric sheeting, such as flat sheets of silicone impregnated glass, around adjacent portions of the connecting ducts with adhesive, such as Room Temperature Vulcanized (RTV) adhesive. The adhesive must be applied at several locations on the duct system, which is difficult because of the limited space around the duct, the time-sensitive nature of completing the adhesive bond, and the uniqueness of the design of the ducts.

The process of bonding the elastomeric sheeting to join the ducts requires surface preparation, cleaning, multiple supplies, and tools. In addition to the supplies and tools used to apply the sheeting to the ducts, an x-ray machine is also typically used to determine the integrity of the bond between the sheeting and the duct. The x-ray photographs of the joint area reveal where there are voids in the adhesive, uneven application of adhesive, substrate mating pressure, or other issues with the adhesive that may affect the bond between the sheeting and the duct. If the x-rays reveal a problem with the bond, then the installer must remove the sheeting and the adhesive, reapply the adhesive and sheeting, and again x-ray the joint to determine the integrity of the bond. This process must be repeated until the bond between the sheeting and the duct is acceptable.

Once the bond between the sheeting and the duct is acceptable, the elastomeric sheeting is then clamped to the ducts with metal band clamps or tie wraps. The clamps, however, do not provide uniform circumferential pressure to the sheeting covered duct joints, particularly not to the ducts that are square or have some other non-round shape. Thus, when a duct experiences deflection due to internal pressure, the clamp may cause the duct surface to concave, which creates a gap and causes leakage of the elements within the duct. Deflection of the duct also may cause the duct to change shape, which may result in the loosening of the grip of the clamps, a break in the adhesive, and leakage of the elements contained in the ducts. Furthermore, even if the clamps remain tightly in place on the sheeting and ducts, the sharp edges of the clamp may cut into the elastomeric sheeting, particularly as the ducts are subjected to the vibrations, shocks and pressures associated with the operation of an aircraft. Once the clamp cuts into the sheeting, the sheeting will tear and, again, cause leakage of the elements contained in the ducts.

The leaking of the elements contained in the ducts is particularly severe in aircraft that are operated in high humidity or tropical climates because the environmental control system ducts contain high levels of moisture condensation. If the ducts are not completely joined and sealed, the fluid may leak onto electrical systems housed below the ducts and through overhead ceiling panels into the passenger area or body of the aircraft. The moisture release may require a pilot to initiate emergency landing procedures, which includes dumping fuel for a premature landing at the nearest airport.

In order to repair the leaking duct joints, the clamps and sheeting must be removed and the adhesive must be cleaned off of the ducts, which is difficult, time-consuming, and prone to damage the ducts. New adhesive, sheeting and clamps then must be re-applied to the ducts, which is another labor-intensive and time-consuming procedure that is not guaranteed to remedy the problem. In addition, during certain mandatory aircraft maintenance and structural checks, the entire environmental control duct system must be removed and re-installed. After repeated repairs and re-installations, the entire environmental control duct system must be replaced because of the wear and tear on the joint bonding surfaces of the ducts. Therefore, in addition to the time and expense involved in the initial joining and sealing of the ducts, the repairs, re-installation and ultimate replacement is extremely costly because of the human labor and time involved, the loss of flight time for the aircraft, and the cost of replacing the parts of the duct system that cannot be reused after removal.

Thus, there exists a need in the industry for an efficient manner in which to join and seal conduits that have inherent system issues. In particular, there exists a need for an efficient way to join and completely seal conduits of various shapes such that the deflection of the conduit under internal pressure will not cause leakage from the joints, and the joints will not have to be repaired or replaced frequently. Additionally, it would be desirable if the joints may be removed for thorough maintenance checks and reinstalled without an excessive investment of human labor and time, without significant loss of flight time for the aircraft, and without having to replace part or all of the conduit system.

BRIEF SUMMARY OF THE INVENTION

The apparatus and method for joining and sealing conduits of the present invention provide an efficient way to join, seal, and maintain conduits that have various shapes and/or are located in areas that are difficult to view and/or access. The apparatus and method of the present invention also provide an efficient manner in which to join and maintain a continuous seal about the joints of conduits of various shapes, which prevents the deflection of the conduit under internal pressure from causing leakage from the joint. As such, the conduit joints sealed by the apparatus and method of the present invention should have to be repaired less often. Furthermore, the conduits joined and sealed by the apparatus and method of the present invention may be removed for thorough maintenance checks and reinstalled without expending large amounts of human labor, time, and testing, and without additional loss of flight time for the aircraft. Because the apparatus for joining conduits of the present invention may be reused after removal, the conduit system can also be reinstalled without having to replace all of the hardware that forms the conduit joint.

The apparatus for joining and sealing conduits, such as ducts, includes edge trim, a sleeve, and a retaining element. The edge trim is shaped to mount upon and engage an end of a conduit. The edge trim is also shaped to extend at least partially along the outer surface of the conduit near the end of the conduit, and may extend at least partially along the inner surface of the conduit near the end of the conduit. A ridge may extend outwardly from the outer surface of the edge trim, near the end of the conduit. The edge trim may be made of an elastomeric material. Alternatively, the edge trim may be made of silicone. In addition, the edge trim may contain reinforcing material The sleeve extends between the conduits and at least partially surrounds the edge trim, including the ridge carried by the edge trim. The sleeve may be made of compressible material, such as elastomeric foam or plastic foam, such that when the retaining element surrounds a portion of the sleeve and the edge trim, the retaining element compresses the sleeve. The sleeve also may have a layer of first elastomer-coated fabric on at least one surface of the sleeve, such as the surface that faces the edge trim. Additionally, a layer of material, at least a portion of which has a lower coefficient of friction than the layer of first elastomer-coated fabric may be located on the side of the sleeve that faces the retaining element contact area to facilitate movement of the retaining element over the sleeve at least initially. The portion of the material having a lower coefficient of friction than the layer of first elastomer-coated fabric may be a second elastomer-coated fabric.

In one embodiment, the sleeve has a core, a first layer and a second layer. The core region of the sleeve has an inner surface and an outer surface. The core region may be made of plastic foam or an elastomeric foam. The first layer of the sleeve is bonded to the inner surface of the core. The first layer may be an elastomer-coated fabric. The second layer of the sleeve is bonded to the outer surface of the core and has a lower coefficient of friction than the first layer. The first and second layers may be longer than the core, such that the first and second layers may be bonded together beyond the ends of the core. The sleeve also may include a third layer bonded to the second layer proximate a medial portion of the sleeve for reinforcement of that portion of the sleeve extending between the conduits to prevent the sleeve from ballooning due to pressure inside the conduit during operation of the conduit.

According to the present invention, the method for fabricating the sleeve may include providing the sleeve core having an inner surface and an outer surface, and positioning uncured elastomer-coated fabric that is longer than the sleeve core on the inner and outer surfaces of the sleeve core. A porous material is placed between the fabric portions that extend beyond the sleeve core to ensure that the fabric portions will not bond, and to allow vapors to escape during curing of the fabric to the sleeve core. The porous material is removed after curing, and the fabric portions that extend beyond the sleeve are then bonded together. The porous material may be made of a breather material and a release film. The method of fabricating the sleeve may also position a band of uncured elastomer-coated fabric over the fabric that is positioned on the outer surface of the sleeve core, typically over a medial portion of the sleeve core, prior to curing the fabric to the sleeve core. The uncured elastomer-coated fabric may be silicone coated fabric.

The retaining element surrounds a portion of the sleeve and the edge trim to hold the sleeve in position with respect to the edge trim. The retaining element is generally made of a rigid material and may have a first portion with a first circumference and a second portion with a second circumference. The first inner circumference may be smaller than the second inner circumference and the retaining element may be placed on the sleeve such that the larger second portion is closest to the end of the conduit. If the edge trim has a ridge, the first portion of the retaining element may surround a portion of the sleeve on the side of the ridge that is opposite the end of the conduit and the second portion of the retaining element may be near the ridge so as to sandwich a portion of the sleeve therebetween.

In one embodiment of the present invention, the retaining element also may have an outwardly extending support having at least one aperture. A tie member may extend through the aperture of the retaining element to lock the retaining element to another retaining element mounted upon an end of another conduit.

The method of joining and sealing conduits of the present invention includes mounting the edge trim and a retaining element upon an end of a conduit, such that the retaining element is further from the end of the conduit than the ridge carried by the edge trim. The edge trim also may be bonded to the conduit during the mounting of the edge trim. The method also includes extending a sleeve between the conduits, such that one end of the sleeve covers the ridge on the edge trim, and sliding the retaining element over the sleeve and toward the ridge, such that a portion of the sleeve is sandwiched between the retaining element and the ridge.

Sliding the retaining element over the sleeve generally compresses that portion of the sleeve that underlies the retaining element and displaces the sleeve material to expand on either side of the retaining element. In sliding the retaining element, the retaining element is generally positioned such that the retaining element is prevented from moving past the ridge toward the end of the conduit and at least partially restrained from moving away from the ridge due to the displaced material on the side of the retaining element opposite the ridge. In one embodiment of the present invention, the method also includes the option of attaching at least one tie member to the retaining element to lock the retaining element to another retaining element mounted upon an end of another conduit.

As a result of its construction and the corresponding installation method, the edge trim, sleeve and retaining element continue to provide a tight, leak-proof seal about the conduits as the shape of the conduits experience deflection due to internal pressure. Moreover, the apparatus and method of the present invention provide an efficient technique to couple conduits, while permitting removal for inspection or the like and subsequent reinstallation, particularly in areas that are difficult to view and/or access.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In many applications, conduits must be installed to facilitate the movement of liquids, gasses, air, or the like from one location to another. Frequently, the conduits must be installed in areas where space is limited, such that the conduit must be installed in segments, then joined and sealed. In addition, because the space is limited, the conduit shape may have to conform to the shape of the area. As such, the conduit may be square, elliptical or some other non-round shape. During operation, however, the shape of a non-round conduit may deflect and deform into a shape that is somewhat more round due to the internal pressure experienced by the conduit. For example, in aircraft, the environmental control system ducts are installed after the aircraft is partially or totally built, such that the shape of the duct must conform to the available space and the ducts must be installed in pieces. Thus, the segments of the duct must be joined and sealed in the already congested areas of the aircraft where there is little room to access or view the entire duct joint area.

Furthermore, conduits may have to be removed periodically for regular maintenance and if objects behind the conduits cannot be accessed without removing the conduits. For instance, during certain mandatory aircraft maintenance checks, the environmental control system ducts must be removed in order to access the objects behind the ducts and subsequently reinstalled. Thus, the present invention is advantageous by providing an apparatus and method for joining conduits of any shape that will continue to seal the conduit even if the conduit experiences deflection during operation. In addition, the apparatus and method of the present invention can be removed and reinstalled in a timely manner without having to replace the conduit or the components of the joining apparatus. As such, the apparatus and method of the present invention provide an efficient and economical way to join and seal conduits in many applications, including onboard an aircraft, spacecraft or other vehicle, as well as in factories and other buildings.

Figure 1:
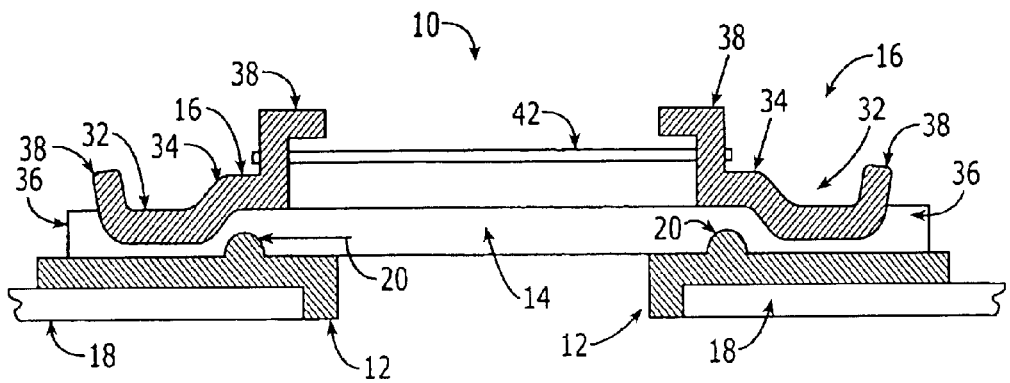
FIG. 1 is a cross-sectional view of an apparatus for joining and sealing conduits according to one embodiment of the present invention.

One embodiment of the apparatus 10 for joining and sealing conduits is shown in FIG. 1. In this embodiment, the apparatus 10 for joining and sealing conduits includes edge trim 12, sleeve 14, and retaining element 16 to join the conduits 18. The conduit 18 may be a duct, hose, pipe, tube or the like.

Figure 2A:
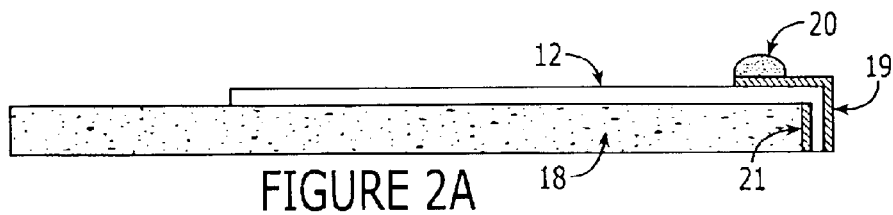
FIG. 2A is a cross-sectional view of the edge trim according to one embodiment of the present invention.
Figure 2B:
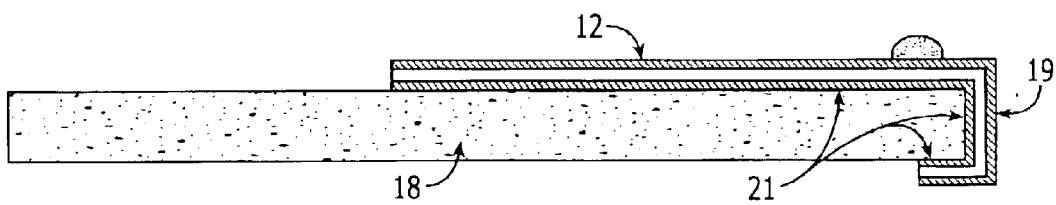
FIG. 2B is a cross-sectional view of the edge trim according to another embodiment of the present invention.
Figure 3:
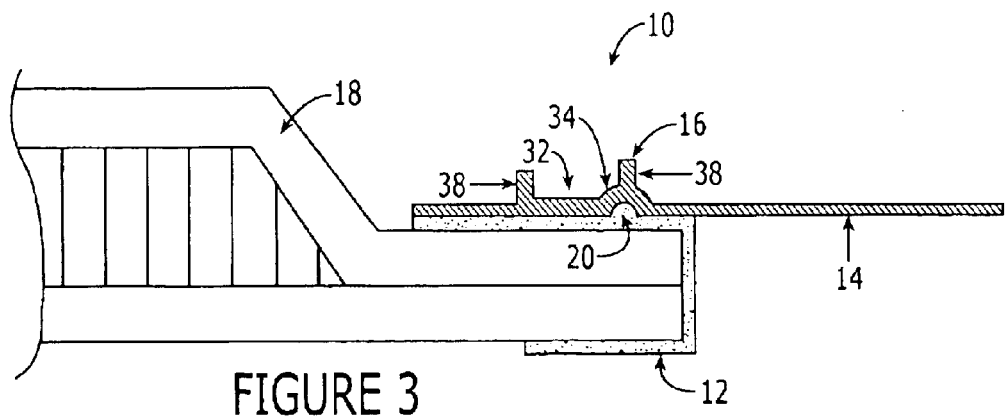
FIG. 3 is a cross-sectional view of the apparatus for joining and sealing conduits according to one embodiment of the present invention, which illustrates one end of a sleeve in more detail.

FIGS. 2A and 2B illustrate two embodiments of the edge trim 12. The edge trim 12 may partially extend about the end of a conduit 18, covering at least the end and part of the outer surface of the conduit, as shown in FIG. 2A. Alternatively, the edge trim 12 also may cover part of the inner surface of the conduit, as shown in FIG. 2B and FIG. 3, which is another embodiment of the apparatus 10 for joining and sealing conduits that includes the edge trim 12 of FIG. 2B. By at least partially extending along the surface of the conduit proximate the end of the conduit, the edge trim 12 provides a smooth surface to support and engage the sleeve 14 and seal the joint. Thus, the edge trim 12 hides any imperfections in the end of the conduit that, without the edge trim, would cause interference in the seal with the sleeve 14, such as imperfections associated with the material type, termination of composite material plies, weldment of metals, kinking in the conduit, and the like. The edge trim 12 also prevents the elements carried by the conduit 18 from penetrating into the end of the conduit and prevents delamination of a composite conduit 18. For example, if a honeycomb material is contained within the conduit walls and is exposed at the end of the conduit, then the embodiment of the edge trim 12 shown in FIG. 2B would prevent moisture penetration into the honeycomb material. Generally, the edge trim 12 is molded to custom fit the shape of the end of the conduit to be joined and sealed, but standard size edge trim may be made for standard conduit shapes and sizes.

The edge trim 12 also may include a ridge 20, commonly known in the aerospace industry as a bead, extending outwardly from the outer surface of the edge trim, near the end of the conduit 18. The ridge 20 is shown on the edge trim in FIGS. 1, 2, and 3. The ridge 20 may extend partially or totally about the circumference of the edge trim 12. The ridge 20 may have various sizes and shapes depending upon the application, but generally has a semicircular or other rounded shape with a height typically less than the thickness of the sleeve 14.

The edge trim 12 may be made of any appropriate material. To create the tightest seal between the edge trim 12 and the conduit 18, however, the edge trim 12 may be made of any semi-compressible, damage tolerant and flexible material, such as an elastomeric material. The elastomeric material may be silicone or an elastomeric-coated fiberglass fabric. The properties of the edge trim 12 may be customized to the specific application and environment of the conduit 18. For instance, the edge trim 12 may be made flame/fire, ballistic, abrasion, impact, solvent, chemical/gas, weather, and/or temperature resistant by selecting the appropriate matrix of materials for the edge trim 12 as will be known to those skilled in the art, such as flourosilicone, nitrile, neoprene, or other elastomers.

The edge trim 12 also may be partially or totally rigidized by forming the edge trim of resin impregnated, fiber reinforced fabrics or otherwise integrating resin impregnated, fiber reinforced fabrics within the edge trim during fabrication. As FIGS. 2A and 2B illustrate, the outer portion 19 of the edge trim 12 that faces away from the end of the conduit 18 may be rigidized to provide stability about the duct end and to maintain the ridge 20 substantially parallel to the end of the conduit 18. In this situation, the inner portion 21 of the edge trim 12 that faces the conduit 18 may be made of any semi-compressible, damage tolerant and flexible material, such as an elastomeric material, in order to ensure a tight seal between the conduit 18 and the edge trim 12.

The type of reinforcement may be selected for the specific environmental application of the edge trim. For example, Nextel™, commercially available from 3M Corporation, polyester, fiberglass, or aramid, such as Kevlar™ commercially available from du Pont de Nemours and Company Corporation, fibers may be added as reinforcement depending upon the desired properties of the edge trim. Futhermore, examples of the resin materials are thermoplastic or thermosett materials. The weave pattern of the fiber reinforcements may also be selected to achieve adaptability in fitting the surface of the conduit 18. For instance, a weave that allows stretch of the edge trim in one direction while stabilizing the edge trim in other directions, known to those skilled in the art as crowfoot weave, may be desirable in applications where one edge trim 12 will accommodate a variety of conduit thicknesses.

Generally, the elastomeric properties of the edge trim 12 may provide adequate friction to fixedly engage and seal about the end of a conduit 18. Alternatively, the edge trim 12 may be bonded to the conduit 18 with any type of compatible adhesive, such as Room Temperature Vulcanized (RTV) adhesive.

Figure 4:
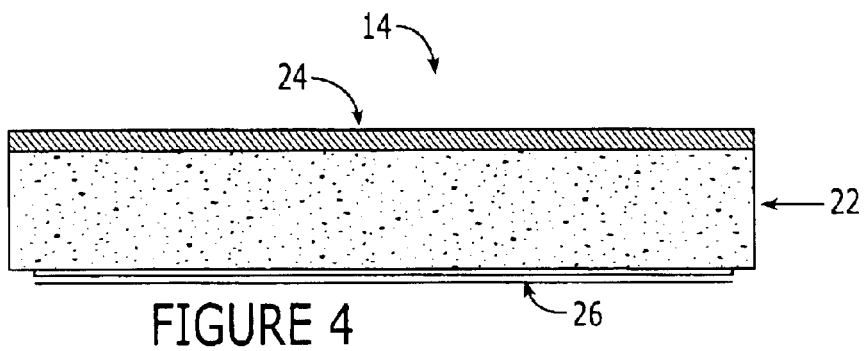
FIG. 4 is a cross-sectional view of the sleeve according to one embodiment of the present invention.

The sleeve 14 of the present invention extends between the conduits to be joined and at least partially surrounds the edge trim 12 on each conduit 18, as shown in FIG. 1 and FIG. 3. If the edge trim 12 has a ridge 20, the sleeve 14 may surround or extend over the ridge 20. A cross-sectional view of one embodiment of the sleeve 14 of the present invention is shown in FIG. 4. While the sleeve may be constructed in different manners, the sleeve 14 of this embodiment contains a core 22, an outer layer 24, and an inner layer 26. The core 22 of this embodiment may be made of any elastomeric or plastic foam, depending upon the specific application and/or environment of the conduit 18. For example, the core 22 may be made of self-skinning cellular silicone foam in applications where controlled compression, rebound resilience, heat resistance, oxidation resistance, and ozone attach resistance is desirable.

To enhance the fluid resistance and friction between the sleeve 14, the edge trim 12 and, in some embodiments, the retaining element 16, an outer layer 24 and inner layer 26 may be bonded to the core 22. The layers 24, 26 may be made of any suitable elastomer coated on a suitable fabric, the specific properties of which are chosen depending upon the application and environment of the conduit 18. For example, both the outer and inner layers 24, 26 may be made of an elastomer-coated fabric, such as a fabric coated with a flouroelastomer, that provides a high coefficient of friction between the sleeve 14 and the components on either side of the sleeve 14. Alternatively, the inner layer 26 may be made of an elastomer-coated fabric with a high coefficient of friction, in order to hold the sleeve 14 on the conduit 18 and/or edge trim 12, while the outer layer 24 may be at least partially made of a low friction material, such as Teflon™ commercially available from du Pont de Nemours and Company Corporation, in order to at least initially slide the retaining ring 16 over the sleeve 14 without difficulty.

The uncured elastomers coated on a fabric may be rubber, rubber-based or silicone material. For a high coefficient of friction, the elastomers may be coated on a fiberglass or other suitable fabric. One example of an elastomer-coated fabric having a relatively high coefficient of friction, particularly when mated with substrate materials, is the fluoroelastomer Viton™, commercially available from du Pont de Nemours and Company Corporation. For a material with a lower coefficient of friction, the elastomers may be coated on a polyester, aramid, such as Kevlar™ commercially available from du Pont de Nemours and Company Corporation, Nextel™ commercially available from 3M Corporation, or any other suitable fabric for the specific application. In addition, to obtain the desired amount of stretch in the layers, the fibers in the fabric may be oriented from a bias position (more stretch) to a non-bias position (less stretch). Bias fabric is made of wrap and fill fibers generally at a 45 degree angle to the length of the fabric, which enables the fabric to stretch in essentially any direction. Non-bias fabric is made from wrap and fill fibers in which the wrap fibers are generally parallel to the length of the fabric and perpendicular to the fill fibers. Non-bias fabric stretches essentially only in the wrap and fill directions, but non-bias fabric may be cut diagonally to the length of the fabric to produce a fabric with bias characteristics. For example, to prevent deflection of the sleeve 14 between the conduits 18 due to internal pressure during operation, the outer and/or inner layer 24, 26 may be made of elastomers coated on a non-bias material, such that the outer layer prevents the sleeve from stretching, and, thus, prevents deflection.

Figure 5:
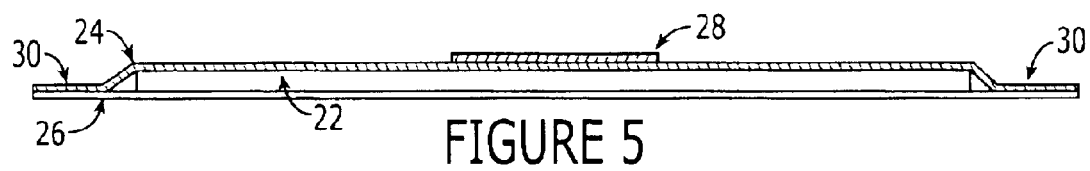
FIG. 5 is a cross-sectional view of the sleeve according to another embodiment of the present invention.

FIG. 5 illustrates another embodiment of the sleeve 14 of the present invention. This embodiment illustrates that a third layer or band 28 may be positioned at or near the middle of the sleeve 14 over the outer layer 24. The band 28 may be made of the same material as the outer layer 24, as described above. The band 28 may be placed on the sleeve 14 in order to prevent deflection of the sleeve 14 between the conduits and, as such, it may be desirable for the band 28 to be made of uncured elastomers coated on a non-bias fabric to prevent or significantly reduce ballooning/stretching of the sleeve in the joint area between the conduits 18. If the outer layer 24 is also made of a non-bias fabric, the band 28, provides additional deflection prevention.

FIG. 5 also illustrates that the outer and inner layers, 24, 26, may be longer than the core 22, such that the layers may completely surround the core 22. The regions 30 of the outer and inner layers, 24, 26, that are longer than the core may be utilized in installation of the sleeve 14 as an area to grasp and pull the sleeve 14 over the edge trim 12 and/or conduit 18.

To bond the layers 24, 26 to the core 22 and, optionally, the band 28 to the outer layer 24, the layers are first positioned on the core 22 in the orientation shown in FIGS. 4 and 5. The oriented layers 24, 26 and the core 22 may be placed about a tool that has the general shape of the desired sleeve 14. The tool is preferably hollow in order to more evenly distribute the heat during the curing process and for ease of removal of the cured sleeve 14 from the tool. The layers 24, 26 and the core 22 may be flat sheets of material that are spliced along the length of the material in order to form the sleeve-shape, or the layers may be pre-molded in the sleeve-shape. Prior to placing the layers 24, 26 and core 22 on the tool, a release material may be applied to tool to prevent the inner layer 26 from bonding to the tool during the heat-cure process. The release material may be a mold release spray, such as Frekote 44NC, commercially available from Dexter Corp., or a non-permeable release film, such as films available from Airtech International, Inc. and Hawkeye Enterprises, Inc. The layers 24, 26 and core 22 then may be placed on the tool after splicing or they may be spliced after being positioned on the tool.

A porous material, which in one embodiment of the present invention comprises a breather material and a permeable release film, is placed between the regions of the layers 24, 26 that extend past the core 22. Examples of the breather material include Airweave N10, commercially available from Airtech International, Inc., and Resin Bleeder 3000A-10, commercially available from Hawkeye Enterprises, Inc. Examples of the permeable release film include permeable resin release film, commercially available from Chemfab Corp. and Richmond Aircraft Products, Inc., and permeable gas release film, commercially available from National Aerospace Supply Co., Chemfab Corp., and Norton Performance Plastics. The porous material prevents vulcanization of the layers 24, 26 during the heat-cure process. The porous material also permits gases to escape during heat-cure process, enabling bonding between the layers 24, 26 and the core 22. Without the porous material, the trapped gases may disadvantageously prevent bonding between the layers 24, 26 and the core 22.

Once the layers 24, 26 and core 22 are oriented and positioned on the tool, a layer of porous material, which may be layers of breather material and permeable release film, as described above, may be placed over the outer layer 24. A wrap, such as a shrink tape wrap or a vacuum bag, may be placed about the porous material, which prevents the wrap from bonding to the outer layer 24 during the heat-cure process. The tool with the layers of materials may then be heat-cured in order to bond the layers 24, 26 to the core 22 and, thus, produce the sleeve 14. After heat-curing, the wrap is removed from the outer layer 24. The porous material(s) may also be removed, and the layers 24, 26 may be bonded together with any type of compatible adhesive, such as Room Temperature Vulcanized (RTV) adhesive. A specific example is RTV 106 or RTV 732. The sleeve may be removed from the tool at any time after the heat-cure process has concluded.

The retaining element 16 is formed to surround a portion of the sleeve 14 and edge trim 12 that are positioned on the conduit 18, in order to hold the sleeve 14 in position with respect to the edge trim 12. The shape of the retaining element 16 may be customized to match the shape of the conduit 18. The retaining element 16 may be made of a rigid material, such that the retaining element 16 firmly and uniformly engages the sleeve 14 and edge trim 12 to provide a seal about the end of the conduit 18. The rigid characteristic of the retaining element 16 also prevents the deflection of the conduit 18 due to internal pressure in the conduit 18, at least near the end of the conduit 18. The anti-deflection feature of the retaining element 16 also adds to the leak-proof nature of the seal created by the retaining element 16 and the other components joining the conduits 18. The retaining element 16 exterts a force on the conduit 18 and the deflection of the conduit 18 exerts an oppositely directed force on the retaining element 16 and the other components, providing a tight seal about the end of the conduit.

The retaining element 16 may be made by a process and from materials, chosen by assessing a variety of factors, such as weight requirements, cost of material, cost of the tools, and quantity. For example, the retaining element 16 may be made of a composite material, fabricated by laminating multiple plies of resin pre-impregnated fiberglass cloth on a metal tool, i.e. a mandrel, defining the shape of the retaining element and oven cured under heat and pressure. Once the retaining element 16 is cured, it may be trimmed to meet the specific design dimensions of the application. Other examples of processes and materials for making the retaining element include injection-molded thermoplastics, compression molded thermoset plastics, and machined, cast and rolled formed metals.

One embodiment of the retaining element 16 may have a first portion 32 and a second portion 34 with first and second inner circumferences, respectively. This embodiment of the retaining element is shown in the cross-sectional views of the apparatus for joining and sealing conduits in FIG. 1 and FIG. 3, and in the cross-sectional view of the retaining element in FIG. 6. The first inner circumference is smaller than the second inner circumference, and when the retaining element 16 is positioned on the sleeve, the larger second portion 34 is closest to the end of the conduit 18. In addition, if the edge trim 12 has a ridge 20, the second portion 34 may engage the ridge 20, such that the retaining element 16 is prevented from moving past the ridge 20 toward the end of the conduit 18.

If the sleeve 14 is made of a compressible material, as discussed hereinabove, then the first portion 32 of the retaining element is preferably sized to be smaller than the nominal, uncompressed size of the sleeve 14, but once the sleeve 14 is mounted upon the conduit 18, equal to or slightly larger than the resulting size if the sleeve 14 were fully compressed. As such, one retaining element 16 generally compresses the sleeve 14 as it is moved toward the end of the conduit 18. Therefore, when the retaining element is in place near the end of the conduit 18, the sleeve 14 may be compressed under at least the first portion 32 of the retaining element 16. Th portions of the sleeve 14 on opposite sides of the first portion 32 of the retaining element 16 are typically uncompressed. The uncompressed portion or portions 36 of the sleeve 14 then may at least partially restrain or discourage the retaining element 16 from moving, at least in the direction away from the end of the conduit 18, once the retaining element 16 is in place.

Figure 6:
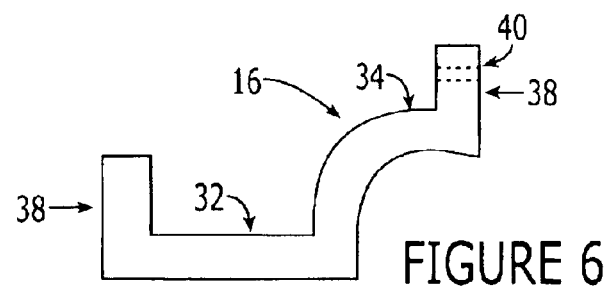
FIG. 6 is a cross-sectional view of the retaining element according to one embodiment of the present invention.

The retaining element 16 may also include at least one outwardly extending support 38. The support 38 prevents or further limits outward deflection of the retaining element 16 to ensure a tight seal. The support 38 may also have an aperture 40, as shown in FIG. 6, such that a tie member 42, as shown in FIG. 1, may extend through the aperture 40 of one retaining element 16 mounted upon a conduit 18 as well as the aperture 40 of another retaining element 16 mounted upon another conduit 18 to lock the retaining elements together and prevent the retaining elements from moving away from the ends of the conduits 18.

To join conduits according to the method of the present invention, the edge trim 12 and the retaining element 16 are mounted upon an end of each respective conduit 18. The edge trim 12 may be bonded to the conduit 18 or the coefficient of friction of the material of the edge trim 12 may be sufficient to hold the edge trim 12 on the conduit 18. If the edge trim 12 has a ridge 20, the retaining element 16 is placed further from the end of the conduit 18 than the ridge 20. The sleeve 14 may then be extended between the conduits 18 to at least partially cover the edge trim 12. If the edge trim 12 has a ridge 20, then one end of the sleeve 14 may cover the ridge 20. The retaining element 16 is then slid over the sleeve 14 toward the end of the respective conduit 18 so as to sandwich the sleeve 14 between the retaining element 16 and the edge trim 12. If the edge trim 12 has a ridge 20, then the retaining element 16 is slid over the sleeve 14 toward the ridge 20, such that a portion of the sleeve 14 is sandwiched between the retaining element 16 and the ridge 20.

As described above, if the sleeve 14 is made of a compressible material, then the retaining element 16 compresses the portion of the sleeve 14 underlying the first portion 32 of the retaining element 16, and the uncompressed portion of the sleeve 36 may serve to restrict further movement of the retaining element 16. To further limit movement of the retaining elements 16, the retaining elements 16 may be attached to each other by a tie member, as also described above.

Once the components are positioned on the conduits 18 as described above, a seal is created about the conduits 18. The seal is made even tighter when the conduits 18 are in operation and experience internal pressure, because the internal pressure deflects the conduit 18 outward and creates a force that is offset by and opposite to the force on the conduit 18 created by the edge trim 12, sleeve 14 and retaining element 16.

Thus, the apparatus and method of the present invention provides an economical and effective way to join and seal conduits. The apparatus of the present invention creates a seal about the ends of the conduits through a combination of components designed to work together by their shape and their material properties. In addition, the properties and characteristics of the components utilize the inherent nature of the conduits to deflect during operation to create an even stronger seal, unlike the conventional sealing methods in which deflection of the conduits typically causes a break in the seal and leakage of the elements carried by the conduits. The apparatus for joining and sealing conduits of the present invention is also much easier to mount upon conduits than the conventional system because the components are premade and designed to fit snuggly about the conduits with very little, if any, adhesive, reducing the time and effort that must be expended by an installer. Furthermore, the apparatus and method of the present invention provide components to join and seal conduits that may be removed and reinstalled without damaging the conduit or the components, which significantly decreases the cost and time involved when removing conduits during maintenance checks or otherwise.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of fabricating a sleeve for joining and sealing conduits, comprising:
    providing a sleeve core having an inner surface and an outer surface;
    positioning an uncured elastomer-coated fabric on the inner surface and the outer surface of the sleeve core, such that portions of the fabric extend beyond the sleeve core;
    placing a porous material between the fabric portions that extend beyond the sleeve core;
    curing the fabric to the sleeve core;
    removing the porous material; and
    bonding the fabric portions that extend beyond the sleeve core.

2. The method of claim 1, further comprising positioning a band of uncured elastomer-coated fabric over the uncured elastomer-coated fabric positioned on the outer surface of the sleeve core prior to curing the fabric to the sleeve core.

3. The method of claim 1, wherein positioning uncured elastomer-coated fabric comprises positioning silicone coated fabric.

4. The method of claim 1, wherein placing the porous material comprises placing a breather material and a release film between the fabric portions that extend beyond the sleeve core, and wherein removing the porous material comprises removing the breather material and the release film.

* * * * *